US006201899B1

United States Patent
Bergen (10) Patent No.: US 6,201,899 B1
(45) Date of Patent: Mar. 13, 2001

(54) METHOD AND APPARATUS FOR EXTENDED DEPTH OF FIELD IMAGING

(75) Inventor: James R. Bergen, Hopewell, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/232,417

(22) Filed: Jan. 15, 1999

Related U.S. Application Data
(60) Provisional application No. 60/103,716, filed on Oct. 9, 1998.

(51) Int. Cl.[7] ................................................... G06K 9/36
(52) U.S. Cl. ............................ 382/284; 382/154; 382/106
(58) Field of Search ................................... 382/284, 215, 382/216, 260, 255, 154, 106

(56) References Cited

U.S. PATENT DOCUMENTS

| | | | |
|---|---|---|---|
| 4,584,704 | 4/1986 | Ferren | 382/65 |
| 4,661,986 | 4/1987 | Adelson | 382/41 |
| 5,325,449 | 6/1994 | Burt et al. | 382/284 |
| 5,878,152 | 3/1999 | Sussman | 382/106 |

OTHER PUBLICATIONS

International Search Report for International (PCT) Application No. PCT/US99/23461 dated Feb. 2, 2000.
Burt et al. "Enhanced Image Capture Through Fusion," David Sarnoff Research Center, Princeton, NJ, 1993.
Burt et al. "A Multiresolution Spline with Application to Image Mosaics" ACM Transactions on Graphics vol. 2, No. 4 (Oct. 1983).

Primary Examiner—Yon J. Couso
(74) Attorney, Agent, or Firm—William J. Burke (57) ABSTRACT

A method for constructing an extended depth of field image from a plurality of source images taken of an object at substantially identical fields of view but at differing focal distances, the method including receiving the plurality of source images, and filtering the plurality of source images to obtain relatively high frequency components in each of the filtered images. The energy levels of the high frequency components are estimated. The sub-regions in each filtered image having energy levels which are greater than energy levels of sub-regions in other filtered images are selected. The selected sub-regions of each filtered image are mapped to corresponding sub-regions in each source image. Finally, the corresponding sub-regions of the source images are merged to obtain the extended depth of field image.

18 Claims, 6 Drawing Sheets

| X | X | X | X |
|---|---|---|---|
| X | X | X | X |
| X | X | X | X |
| X | X | X | X |

$L_M(0)$

| 6 | 6 | 2 | 2 |
|---|---|---|---|
| 6 | 5 | 1 | 1 |
| 2 | 2 | 0 | 0 |
| 0 | 0 | 0 | 0 |

$E_M$

| 1 | 1 | 0 | 0 |
|---|---|---|---|
| 1 | 1 | 0 | 0 |
| 0 | 0 | 0 | 0 |
| 0 | 0 | 0 | 0 |

METHOD AND APPARATUS FOR EXTENDED DEPTH OF FIELD IMAGING

This application claims the benefit of the filing date of U.S. Provisional Application No. 60/103,716, filed Oct. 9, 1998.

FIELD OF THE INVENTION

The present invention relates, in general, to image processing and, more specifically, to a method and apparatus for combining multiple source images of substantially identical fields of view but differing focal distances into a single image that appears to be in focus at all points in the field of view.

BACKGROUND OF THE INVENTION

It is difficult to produce a 2-dimensional image of a relatively deep 3-dimensional scene in which both relatively close and relatively distant objects within the scene appear in focus. For example, when a microscope is used to photograph a 3-dimensional specimen, portions of the specimen that are not in or near the focal plane are blurred or invisible.

Adelson in U.S. Pat. No. 4,661,986 (incorporated herein by reference) teaches a method for obtaining a focused 2-dimensional image from an assemblage of M separately focused 2-dimensional images of the same 3-dimensional scene. Adelson employs an image processing algorithm developed by Dr. Peter J. Burt (hereinafter referred to as the Burt Pyramid). Adelson's method separately analyzes each of the M separately focused images into N similar sets of pixel samples. The method then selects, on a pixel-by-pixel basis from each group of M corresponding sets of the assemblage, the best focused pixels, to derive a single analyzed image of N sets of improved-focus pixels. By employing the Burt Pyramid image synthesizing technique, Adelson synthesizes the final 2-dimensional image from the single analyzed image of N sets.

Adelson describes the selection of image pyramid coefficients from a collection of source image pyramids by taking those of maximum squared value or maximum absolute value, or by other methods that depend on the relative coefficient values themselves. Adelson thus constructs a pyramid transform for each source image. At each pyramid sample position, corresponding samples of each sub-group are selected. All the selected sub-groups are combined to form a single pyramid representing the composite image. The composite image is recovered through an inverse Burt pyramid transform.

The Burt pyramid transform of the improved-focus two-dimensional image is assembled octave by octave, choosing the corresponding octave of the original image having the highest intensity level. The improved-focus two-dimensional image is then generated from its Burt pyramid transform by performing an inverse pyramid transform procedure. A bibliography of the early literature concerning the Burt pyramid transform may be found in U.S. Pat. No. 4,661,986.

Figure 1:
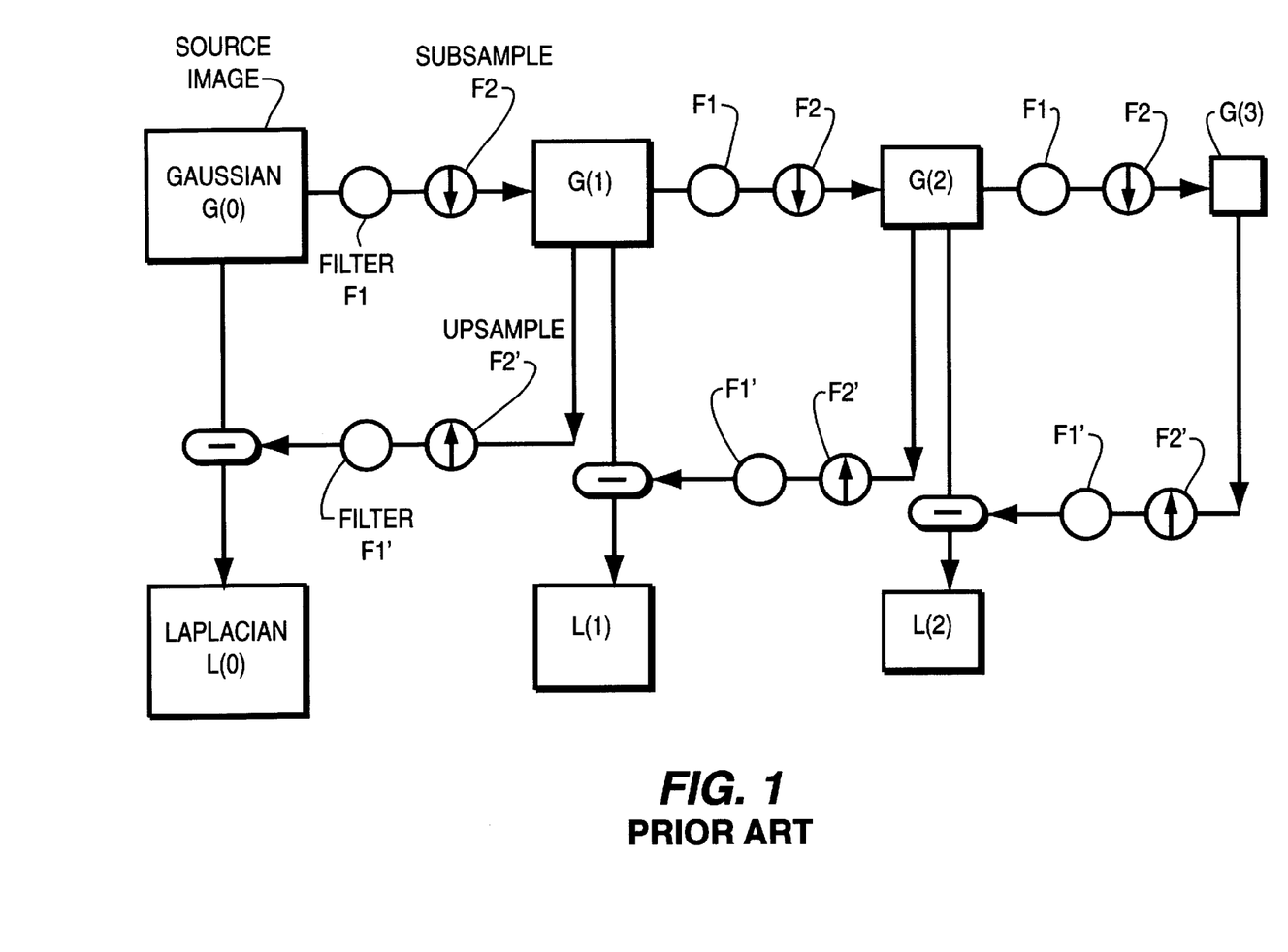
FIG. 1 diagrammatically illustrates a prior art method for forming Gaussian and Laplacian pyramids.

The Burt pyramid may be viewed as a set of low-pass or band-pass filtered copies of an original image in which both the band limit and the sample density are reduced in regular steps. Pyramid construction is outlined in FIG. 1. The process begins with the formation of a low-pass filter or Gaussian pyramid through the steps shown on the top row of FIG. 1. The original image, or source image, is designated as G(0). This original image, G(0), is first low-pass filtered (F1) then subsampled by a factor of two in the vertical and horizontal directions (F2) to obtain an image G(1), which is half as large in each dimension as G(0). G(1) is then filtered and subsampled in the same way to obtain G(2). These steps are iterated to generate the tapering sequence of images which constitute levels of the pyramid. Since both resolution and image size are decreased, the formation of the various levels of the Gaussian pyramid may be referred to as filtering and decimating steps. With each level of the pyramid, the bandwidth is reduced by one octave step.

The Gaussian pyramid is a set of low-pass filtered images. In order to obtain band-pass images, each level of the Gaussian pyramid may be subtracted from the next lowest level, as shown in the bottom row of FIG. 1. Because these arrays differ in sample density, it is necessary to interpolate new samples between those of a given array before it is subtracted from the next lowest array. As shown, the Laplacian, for example L(0), is formed by restoring the subsampled data from G(1), for example (by inserting zero-valued samples between the given samples (F2') then applying an interpolation filter (F1')) and subtracting the data from the G(0) Gaussian. The Laplacian formed this way is known as the reduce-expand Laplacian. Alternatively, the Laplacian may be formed without subsampling and re-interpolation, as shown by the dotted line in FIG. 1. This is known as a filter-subtract-decimate Laplacian. Thus, the Laplacian is a sequence of band-pass images L(0), L(1), L(2), etc. This is precisely how Adelson separates the visual frequencies of each source image into eight ranges.

SUMMARY OF THE INVENTION

To meet this and other needs, and in view of its purposes, the present invention provides a method for constructing an extended depth of field image from a plurality of source images taken of an object at substantially identical fields of view but at differing focal distances. In one embodiment the method includes the following steps:

a) receiving the plurality of source images, b) filtering the plurality of source images to obtain relatively high frequency components in each of the filtered images, c) estimating energy levels of the high frequency components, d) selecting sub-regions in each filtered image having energy levels which are greater than energy levels of sub-regions in other filtered images, e) mapping the selected sub-regions of each filtered image to corresponding sub-regions in each source image, and f) merging the corresponding sub-regions of the source images to obtain the extended depth of field image.

The filtering may include constructing a Laplacian pyramid of various levels or using other digital filters, such as a discrete Fourier transform, a recursive or non-recursive filter.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The invention relates to apparatus and method for constructing a single image from multiple source images. The multiple source images have substantially the same field of view but differing focal distances. In one embodiment, the invention uses the apparatus shown in FIG. 2 to obtain a set of images, each image having been obtained at a different focal distance. As shown, an extended depth of field imaging system 10 includes an optical system 22 having a field of view 26 focused on object 28. A drive mechanism 24, which is controlled by imaging control 20, is coupled to optical system 22 for changing the distance (D) between the lens (not shown) and the object. In this manner, the lens is placed in a succession of different distances from the object, while concurrently maintaining the same field of view. The image plane is also kept at a fixed focal length from the lens, while successive changes in each distance to the object are made. In another embodiment, the image plane is kept at a substantially constant distance from the lens, while successive changes in the focal length of the optical system are made.

Figure 2:
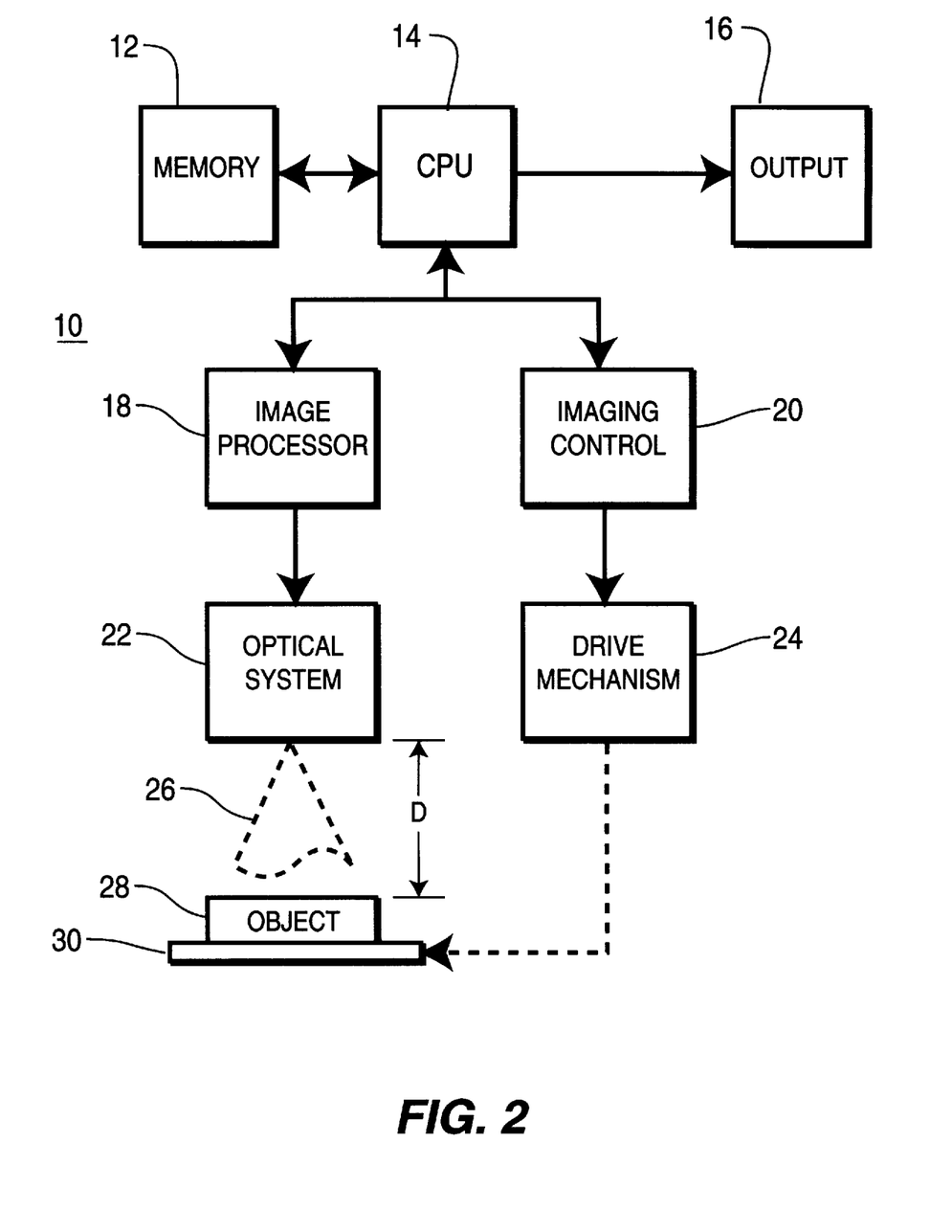
FIG. 2 is a block diagram of apparatus for obtaining multiple source images of an object at substantially identical fields of view but differing focal distances and combining the source images into a single composite image.

Since object 28 is 3-dimensional, only a portion of the object is in-focus on any particular image taken by optical system 22. For each succession of distance (D) a different portion of object 28 is in-focus. Thus, a succession of M-images are obtained, each image having sub-regions that are in-focus and remaining sub-regions that are out-of-focus.

Image processor 18 processes the successive images from optical system 22. Each image is sampled and converted from analog to digital form. The digitized sampled data pixels are supplied to CPU 14. As described below, CPU 14 analyzes each image, selects from each image sub-regions that are in-focus and discards sub-regions that are out-of-focus. As also described below, CPU 14 merges all the images into a single composite image. The composite image may be stored in memory 12 or provided for user viewing by way of output 16. Output 16 may be, for example, a printer, a display or an image storage memory.

In another embodiment of this invention, drive mechanism 24 may be coupled to a movable platform 30, instead of the optical system. In this manner, the optical system 22 may remain stationary and the successive changes in the distance (D) may be effected by moving platform 30.

Figure 3:
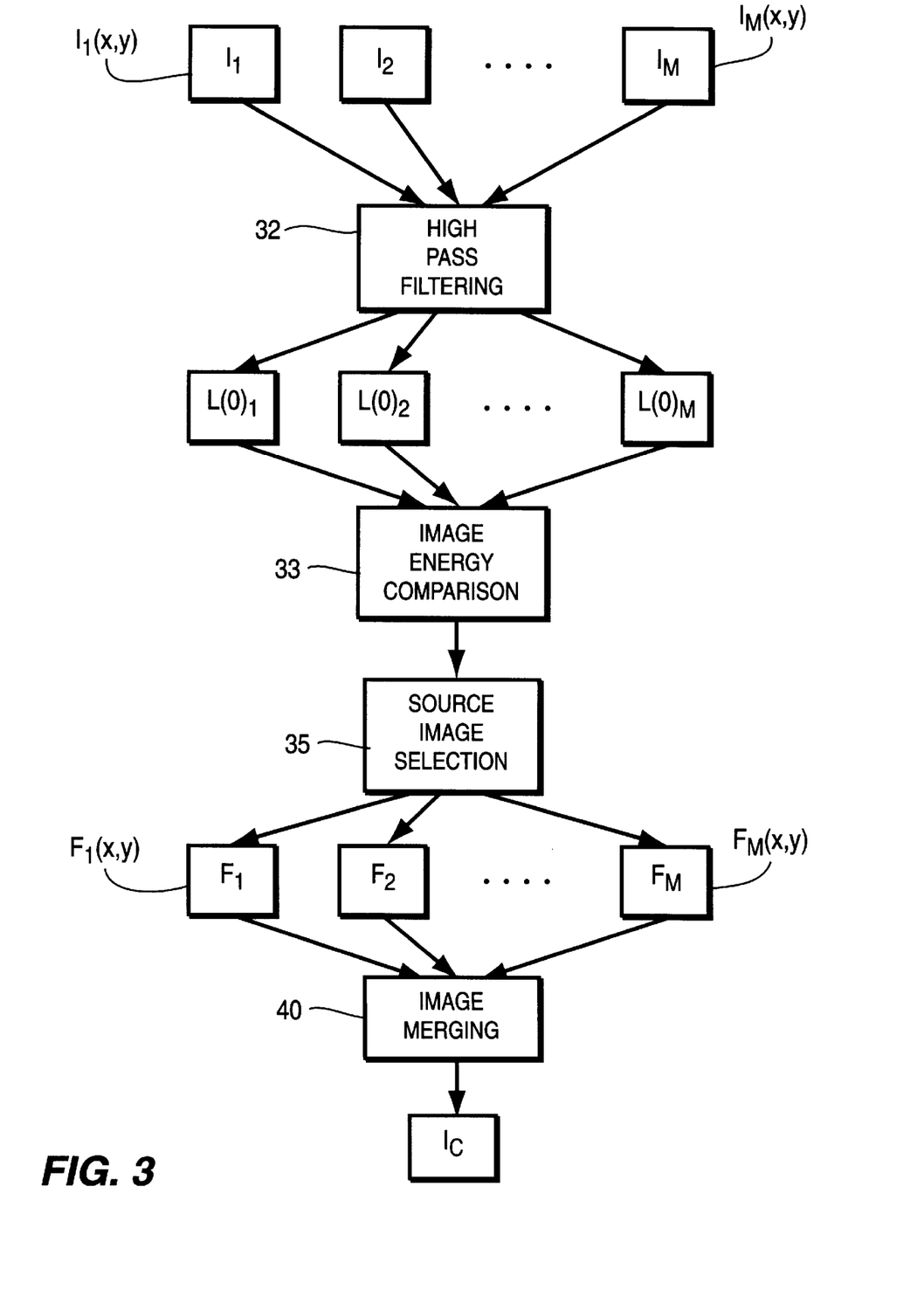
FIG. 3 is a flow chart illustrating the successive steps of the image processing method of the present invention.
Figure 4:
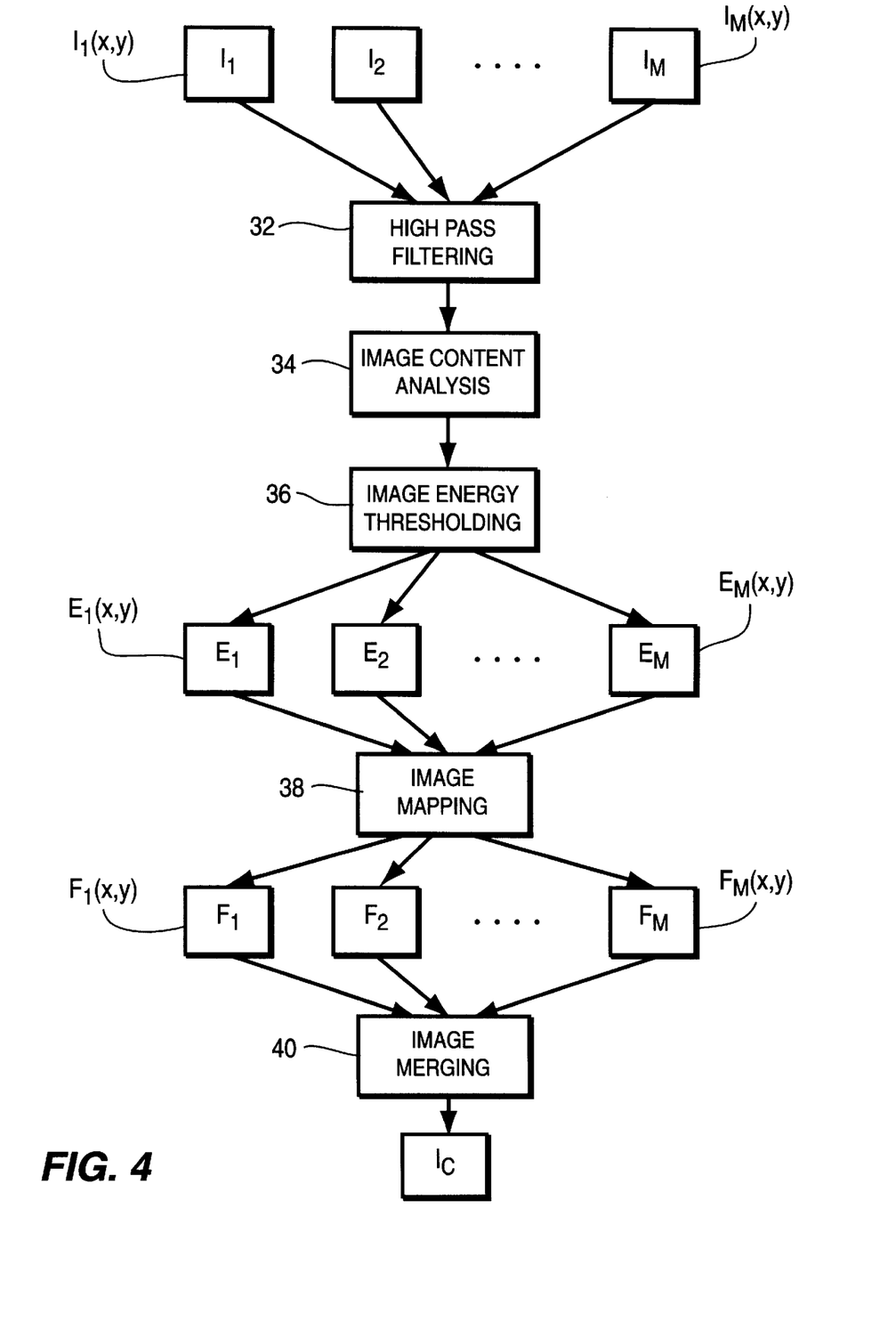
FIG. 4 is a flow chart illustrating the successive steps of the image processing method of another embodiment of the present invention.
Figure 5:
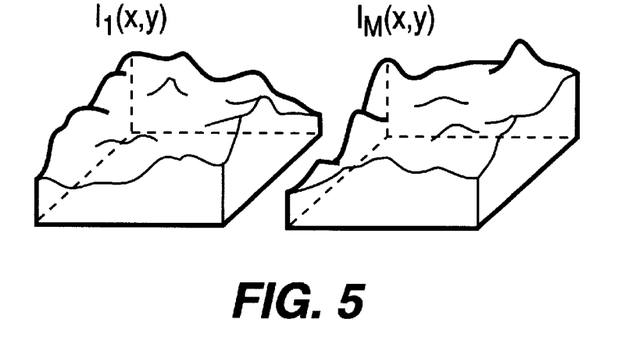
FIG. 5 is an illustration of two images with different sample values represented as two surfaces above the (x,y) plane.

A method of the invention for forming a composite image using the extended depth of field imaging system is shown in FIG. 3. The exemplary method may be implemented as a computer program embedded in a carrier, such as a diskette, a CD-ROM or a modulated carrier wave. The image processing method operates on M separately focused 2-dimensional images of the same 3-dimensional scene. The M images are respectively designated $I_1$ to $I_M$. Each of the separately focused images may be either in sampled or non-sampled analog form, or alternately, in sampled digital form. In the exemplary embodiment, each image is in sampled digital form and is stored in a respective memory location. Each image may be considered as a surface above the (x,y) plane, as shown in FIG. 4. Two images $I_1$ (x,y) and $I_M$ (x,y) are shown, where image intensity I (x,y) corresponds to elevation above the (x,y) plane. In digital form, each image is a sampled array of pixels. For example, $I_1$ (x,y) is the intensity level of the pixel at (x,y) location of source image $I_1$. The intensity level of each pixel may, for example, be stored in a bit-map-organized memory.

In another embodiment the images are taken from different positions and then is processed to produce an aligned set of images $I_1$ (x,y) to $I_M$ (x,y). The source images are desirably aligned with one another so that each is in registration with corresponding portions of neighboring images. Alignment entails finding a geometrical transformation, or a "warping," which, after being applied to all of the images, brings them into a common coordinate system. The geometric transform is typically defined in terms of a set of parameters. These may be shift, rotate, dilate, projective, high order polynomial, or general flow (e.g., piece wise polynomial, with a different set of parameters at each sample point). Warping techniques are disclosed in U.S. patent application Ser. No. 08/838,101 filed Apr. 15, 1997 and entitled "Computationally Efficient Digital Image Warping" which is incorporated herein by reference in its entirety.

Alignment may be done interactively through a user interface (not shown) by having the user indicate corresponding points, then finding the transform parameters that bring these points into registration (or most nearly into registration according to some least error criterion), or by specifying the transformation parameters interactively (e.g., with a mouse or other pointing device).

Alignment may also be done automatically by various image processing methods that determine the warp parameters that provide a best match between neighboring images. Alignment may combine manual and automatic steps. For example, an operator may bring the images into rough alignment manually, then invoke an automatic process to refine the warp parameters to provide precise alignment.

Referring again to FIG. 3, each source image is high pass filtered in step 32. The high pass filtering may be done by a high-pass filter circuit (not shown) which eliminates the low frequency content of the image, or by use of the Burt pyramid. In one embodiment of this invention, only the L(0) Laplacian level is obtained. This may be done simply by using the filter-subtract-decimate Laplacian discussed before. In step 32, each filtered image, as represented by the L(0) Laplacian, is analyzed by considering the energy level of each sample in the L(0) image. Since the L(0) image contains high frequency components of the original source image, the energy level of each sample in the L(0) image is indicative of high frequency activity. The higher the energy level of the high frequency component of a sample, the more significant is that sample in its contribution to the final combined image. This is based on the observation that in-focus images and out-of-focus images differ significantly only in their high-frequency components.

In step 33, the energy level of each sample or sub-region in the L(0) image is compared to the energy level of other samples or sub-regions of L(0) images. The single source image sample or sub-region that has the highest high frequency energy is then selected in step 35. The selection may be done by comparing one sub-region with another sub-region, where a sub-region may contain a single pixel or multiple pixels. Thus, while the comparison is done at the L(0) image level, the selection of sub-regions is done at the source image level. After selection of the sub-regions having the highest high frequency energy, multiple in-focus partial images, $F_1$ (x,y), $F_2$ (x,y), . . . $F_M$ (x,y) are obtained, as shown. It will be appreciated that each in-focus image contains selected portions of corresponding portions of a source image. For example, in-focus image $F_1$ (x,y) contains the content of sub-regions of the $I_1$ (x,y) source image, and in-focus image $F_M$ (x,y) contains the content of sub-regions of the $I_M$ (x,y) source image. The final step in the method, step 40, is image merging of all the sets of in-focus images, $F_1$ (x,y), $F_2$ (x,y), . . . $F_M$ (x,y). A single composite image is thus constructed having an extended depth of field. Since a single in-focus image is selected at each sub-region, the merging process is mostly concerned with avoiding the appearance of seams between the sub-regions.

Another embodiment of the invention is shown in FIG. 4. Each source image is high pass filtered in step 32. The high pass filtering may be done by a high-pass filter circuit (not shown) or by use of the Burt pyramid. In step 34, each filtered image, as represented by the L(0) Laplacian, is analyzed by considering the energy level of each sample in the L(0) image. Since the L(0) image contains high frequency components of the original source image, the energy level of each sample in the L(0) image is indicative of high frequency activity. The higher the energy level of the high frequency component of a sample, the more significant is that sample in its contribution to the final combined image.

In step 36, the energy level of each sample in the L(0) image is passed through a comparator having a predetermined threshold level. Samples having energy levels above the predetermined threshold level form energy sample sets, as follows:

$$E_M(x, y) = \begin{cases} 1 \text{ if } L_M(0, x, y) \geq \text{scalar value} \\ 0 \text{ if } L_M(0, x, y) < \text{scalar value} \end{cases}$$

where $E_M$ (x,y) is a set of 0's and 1's corresponding to every sample location in $L_M$ (0,x,y); and $L_M$ (0,x,y) is the L(0) Laplacian of source image $I_M$.

Figure 6:
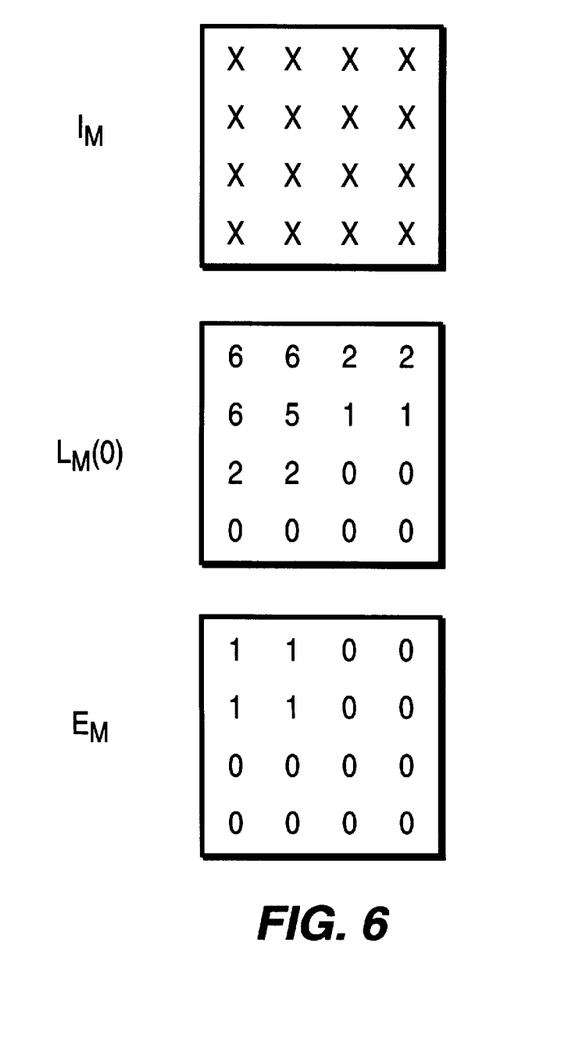
FIG. 6 is an image diagram which is useful for describing the method shown in FIG. 4.

To help explain the embodiment of the invention shown in FIG. 4, a source image $I_M$ is shown in FIG. 6 and includes a 4×4 pixel sample set, with each pixel having a different intensity level. After high pass filtering, the $L_M(0)$ image shows high levels of energy at the top, left corner of the array. After thresholding at a predetermined level, for example level 3, the $E_M$ set contains 1's at the top, left corner and 0's everywhere else.

Image mapping is performed next in step 38. Each of the source images, $I_M$, is multiplied by the sample set $E_M$ to obtain the in-focus regions of each source image:

$$F_M(x,y)=E_M(x,y)I_M(x,y)$$

Figures 7, 8:
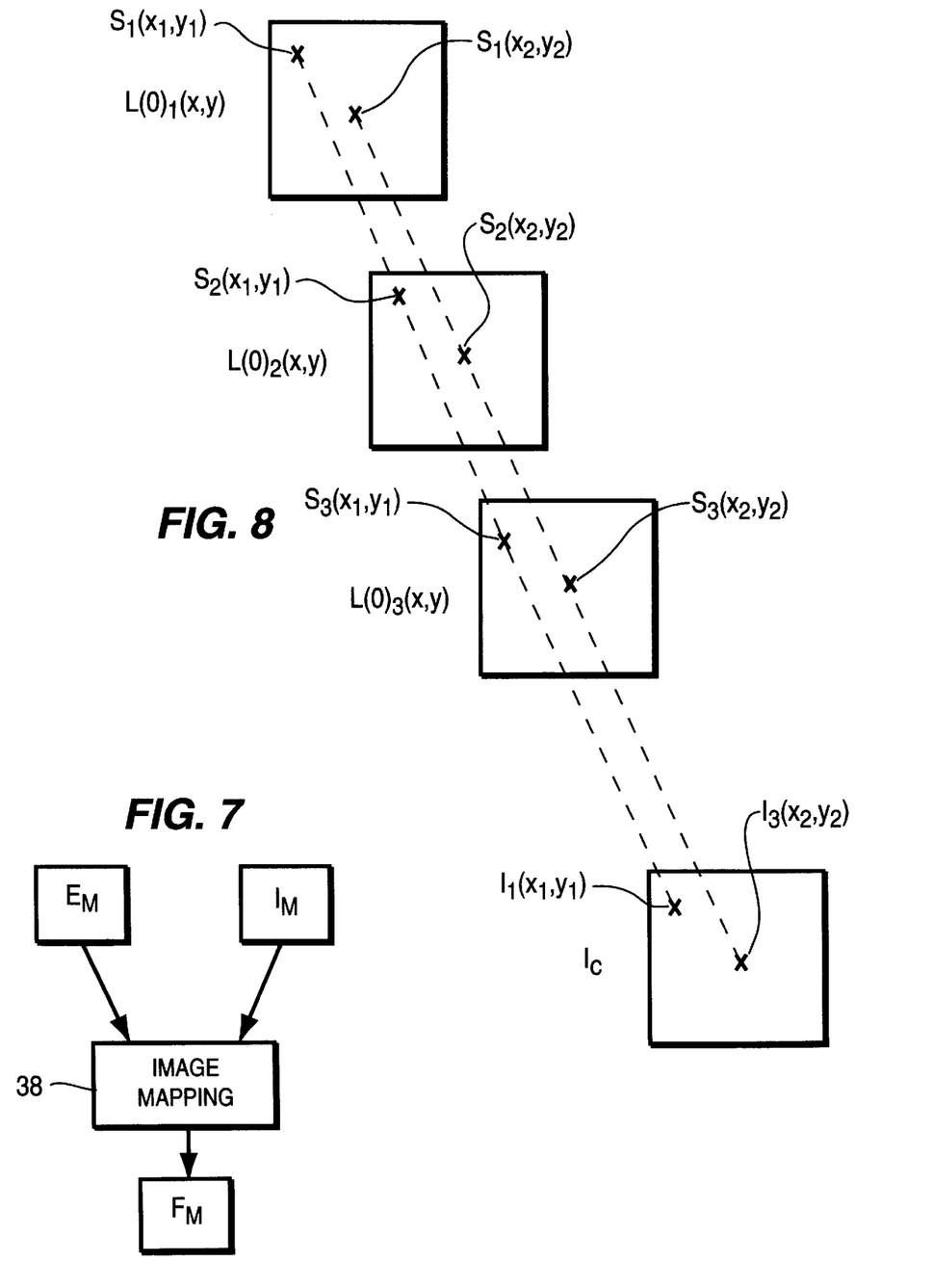
FIG. 7 is a flow chart illustrating image mapping.
FIG. 8 is an illustration of a composite image with each pixel formed from a source image pixel having the highest high frequency energy content.

This method is illustrated in FIG. 7. The image $F_M$ (x,y) is a copy of image $I_M$ (x,y) everywhere that $E_M$ (x,y) has a value 1. The image $F_M$ (x,y) is 0 everywhere else.

The final step in the method, step 40, is image merging of all the sets of in-focus images $F_1$ (x,y), $F_2$ (x,y) . . . $F_M$ (x,y). A single composite image is thus constructed having an extended depth of field. At sample locations where the in-focus images are distinctly different, the merging process may select the most salient component pattern and copy it to the composite image, $I_C$, while discarding less salient patterns. At sample locations where the in-focus images are similar, the process may average the patterns. Averaging reduces noise and provides stability where in-focus images contain the same pattern information.

Pattern selective image fusion is guided by two measures: a match measure that determines the mode of combination at each sample position (selection or averaging), and salience measures that determine which in-focus pattern is chosen in the selection mode. The salience of a particular component pattern is high if that pattern plays a role in representing important information in a scene. Salience is low if the pattern represents unimportant information, or, particularly, if it represents corrupted image data. In general, a pattern may be expected to be important if it is relatively prominent in the image. Thus the amplitude of a pattern can be taken as a generic measure of its salience. Alternatively, the contrast of the component pattern with neighboring patterns can provide that measure. The neighboring patterns may include the sample itself (point case) or a 3×3 or 5×5 array of samples centered on the sample itself (area case).

The match measure may be used to determine which of the two combination modes, selection or averaging, to use at each sample position. The relative amplitudes of corresponding patterns in the in-focus images ($F_1$, $F_2$, - - - $F_M$) may be used as a measure of their similarity, or match. Alternatively, the correlation between images in the neighborhood of the in-focus images may provide that measure. Again, the neighborhood may include only the given component pattern (point case) or it may include a local array of components (area case).

Merging of images by using salient information from each image for inclusion in the composite image has been described by Burt et al. in "Enhanced Image Capture Through Fusion" (International Conference on Computer Vision Proceedings, 1993) and is incorporated herein by reference for its teachings on image fusion. Various other methods exist for constructing a composite image from multiple source images. These methods are disclosed in U.S. patent application Ser. No. 08/896,887, entitled "Method and Apparatus for Mosaic Image Construction," which is incorporated herein by reference. A third publication, incorporated herein by reference, which describes methods for combining images is "A Multiresolution Spline with Application to Image Mosaics," by Burt et al. (ACM Transactions on Graphics, Vol. 2, No. 4, October 1983, Pages 217–236).

In another embodiment, each source image is high pass filtered. The high energy samples in the L(0) image are assigned scalar values. For example, as shown in FIG. 8, source image $I_1$ is high pass filtered. The high pass filtered image, for example $L(0)_1$ is examined. In the example shown, two sample points ($x_1$, $y_1$) and ($x_2$, $y_2$) have energy values resulting from high frequency components. The two sample points are respectively assigned scalar values $S_1$ ($x_1$, $y_1$) and $S_1$ ($x_2$, $y_2$). In a similar fashion, source images $I_2$, $I_3$, etc. are respectively high pass filtered. Scalar values $S_2$ ($x_1$, $y_1$) and $S_2$ ($x_2$, $y_2$) are assigned to the $L(0)_2$ image and scalar values $S_3$ ($x_1$, $y_1$) and $S_3$ ($X_2$, $y_2$) are assigned to the $L(0)_3$ image. The value of the assigned scalar is dependent on the magnitude of the energy present at the sample location. The composite image is then constructed from the individual source images by taking a sample value from a source image which has the largest scalar value for the sample location. For example, the composite image Ic is constructed from the $I_1$ source image at sample location $(x_1, y_1)$, assuming that the scalar value $S_1$ is the largest value at location $(x_1, y_1)$. Similarly, the composite image Ic is constructed from the $I_3$ source image at sample location $(x_2, y_2)$, assuming that the scalar. value $S_3$ is the largest at sample location $(x_2, y_2)$. The remaining sample locations of the composite image are similarly constructed.

In the embodiment described, only the L(0) image of the Laplacian pyramid was constructed. In another embodiment, multiple levels of the Laplacian pyramid may be constructed. Using multiple levels may result in better stability and added smoothness in the composite image. If significant impulse noise is present in the source images, using only the L(0) level is not sufficient to determine the in-focus sample locations. The noise levels in the L(0) image may be larger then the energy levels of the high frequency components of the in-focus samples. Therefore, in situations where image noise may be present, more detailed examination is desirable to determine which samples are in-focus and which samples are out-of-focus.

Consequently, in the presence of noise, pyramid construction may proceed up to the next level, the L(1) image level. Since granularity at the L(1) level is less by a factor of two (in both the horizontal and vertical directions) then the granularity at the L(0) level, the decision of source locations for pixels is made on a sub-region having 2×2 pixels, instead of a sub-region having only one pixel. Where image noise is predominantly impulse noise, the L(1) level may be sufficient. For other types of noise, it may be desirable to use higher level Laplacian pyramid levels or a combination of high level and low level Laplacian pyramids to identify in-focus sub-regions of the various source images. It will be appreciated that after the Laplacian pyramid is constructed up to the L(1) level and a decision is reached at the L(1) level as to what sub-region has the highest energy value of frequency components, then the next step simply requires selecting the corresponding sub-region from the source image contributing the high energy frequency components. Thus, an inverse pyramid transform is not required.

In another variation, instead of selecting source image locations by examining one pyramid level only, for example, L(0) or L(1) level, the decision may be made based on averaging the energy values of both corresponding L(0) and L(1) sub-regions. Since granularity at various levels is different, a weighting factor may be applied so that the decision is biased toward the highest granularity level (L(0)).

In the embodiments described pyramid filtering is implemented. It will be appreciated that other types of filters may be utilized. Any digital filter may be synthesized either by direct convolution, by linear recursive equations, or by the use of discrete Fourier transform (DFT). Recursive or non-recursive filters may be used. A recursive filter is descriptive of a filter that computes a new output sample from a linear combination of previous output samples, as well as the latest and previous input samples. Similarly, a non-recursive filter describes a computation for which the new output sample is a linear function of only the input samples. Sometimes these filters are described by their impulse response. Thus, a recursive filter is defined by an impulse response of infinite duration and a non-recursive filter is defined by an impulse response of finite duration. The transfer characteristics of a digital filter are described in terms of a z-domain transfer function.

Implementation of these filters is well known in the art. The three basic operations to be realized in the implementation of a digital filter are delay, addition (or subtraction) and multiplication. Serial delays ($Z^{-1}$) are realized simply as single-input single-output shift registers.

The digital filter for one embodiment of this invention may have the form of a high-pass filter or a band-pass filter. The filter may also be equalized with unity gain at all pass frequencies. For example, the spatial frequency content of a video source image may typically contain frequencies from 30 Hz to 3600 Hz/radian spatial frequency range of the human visual response. The filter accordingly may be designed to pass all frequencies above 1800 Hz, for example. Frequencies below 1800 Hz may possibly be ignored, especially where image noise is predominantly impulse noise. A more complex filter implementation may be constructed to allow high frequency image information to pass through the filter while being relatively insensitive, at least to impulse image noise.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. It will be understood, for example, that the present invention is not limited to examining only the L(0) or L(1) levels, but rather the pyramid may be constructed and examined at a higher value, for example the L(2) or L(3) level. Furthermore, decisions on source image locations may be based on sub-regions of varying area, for example 2×2 pixels, 4×4 pixels, etc.

What is claimed is:

1. A method for constructing an extended depth of field image from a plurality of source images taken of an object at substantially identical fields of view but at differing focal distances, the method comprising the steps of:
   a) receiving the plurality of source images,
   b) filtering the plurality of source images to obtain respective filtered images representing relatively high frequency components in each of the source images,
   c) estimating energy levels of the high frequency components in the filtered images,
   d) selecting sub-regions in each of the filtered images having energy levels which are greater than energy levels of sub-regions in other ones of the filtered images,
   e) mapping the selected sub-regions of each filtered image to corresponding sub-regions in each source image, and
   f) merging the corresponding sub-regions of the source images independently of any of the filtered images to obtain the extended depth of field image.

2. The method of claim 1 wherein the merging step includes forming a sub-region for the extended depth of field image by averaging one corresponding sub-region of one of the source images with at least one corresponding sub-region of another one of the source images.

3. The method of claim 1 wherein the filtering step includes constructing a Laplacian image for each source image.

4. The method of claim 3 wherein the Laplacian image includes an image from one of an L(0) level image, an L(1) level image, an L(2) level image and an L(3) level image.

5. The method of claim 1 wherein the filtering step includes constructing a plurality of images corresponding to a plurality of consecutive levels in a Laplacian pyramid.

6. The method of claim 1 wherein the filtering step includes filtering the source images according to a transfer characteristic of one of a finite impulse response high-pass filter and an infinite impulse response high-pass filter.

7. The method of claim 1 wherein each sub-region is an array of pixels.

8. The method of claim 1 wherein each sub-region is a single pixel.

9. A carrier conveying a plurality of instructions, the plurality of instructions including instructions which, when executed by a processor, cause the processor to perform the steps of:

a) reading a plurality of source images, b) filtering, the plurality of source images to obtain respective filtered images representing relatively high frequency components in each of the source images, c) estimating energy levels of the high frequency components in the filtered images, d) selecting sub-regions in each of the filtered images having energy levels which are greater than energy levels of sub-regions in other ones of the filtered images, e) mapping the selected sub-regions of each filtered image to corresponding sub-regions in each source image, and f) merging the corresponding sub-regions of the source images independently of any of the filtered images to obtain the extended depth of field image.

10. The carrier of claim 9 wherein the instructions which implement the merging step cause the computer to form a sub-region for the extended depth of field image by averaging one corresponding sub-region of one of the source images with at least one corresponding sub-region of another one of the source images.

11. The carrier of claim 9 wherein the instructions which implement the filtering step cause the computer to construct a Laplacian image for each source image.

12. The carrier of claim 11 wherein the Laplacian image includes an image from one of an L(0) level image, an L(1) level image, an L(2) level image and an L(3) level image.

13. The carrier of claim 9 wherein the instructions which implement the filtering step cause the computer to construct a plurality of images corresponding to a plurality of consecutive levels in a Laplacian pyramid.

14. The carrier of claim 9 wherein the instructions which implement the filtering step cause the computer to filter the source images according to a transfer characteristic of one of a finite impulse response high-pass filter and an infinite impulse response high-pass filter.

15. Apparatus for constructing an extended depth of field image comprising means for obtaining a plurality of source images, each of the images representing an object at substantially identical fields of view but at differing focal distances, means for filtering the plurality of source images to obtain respective filtered images representing relatively high frequency components in each of the source images, means for estimating energy levels of the high frequency components in the filtered images, means for selecting sub-regions in each of the filtered images that have energy levels which are greater than energy levels of sub-regions in other ones of the filtered images, means for mapping the selected sub-regions of each filtered image to corresponding sub-regions in each source image, and means for merging the corresponding sub-regions of the source images independently of any of the filtered images to obtain the extended depth of field image.

16. A method for constructing an extended depth of field image from a plurality of source images taken of an object from different fields of view, the method comprising the steps of:

a) receiving the plurality of source images, b) aligning the plurality of source images by warping to obtain a plurality of warped images, c) filtering the plurality of warped images to obtain filtered images representing relatively high frequency components in each of the warped images, d) estimating energy levels of the high frequency components in the filtered images, e) selecting sub-regions in each of the filtered images having energy levels which are greater than energy levels of sub-regions in other ones of the filtered images, f) mapping the selected sub-regions of each filtered image to corresponding sub-regions in each warped image, and g) merging the corresponding sub-regions of the warped images independently of any of the filtered images to obtain the extended depth of field image.

17. A method for constructing an extended depth of field image from a plurality of source images taken of an object at substantially identical fields of view but at differing focal distances, the method comprising the steps of:

a) receiving the plurality of source images, b) filtering the plurality of source images to obtain respective filtered images representing relatively high frequency components in each of the source images, c) estimating energy levels of the high frequency components in the filtered images, d) selecting sub-regions in each of the filtered images having energy levels which are greater than a threshold value, e) mapping the selected sub-regions of each filtered image to corresponding sub-regions in each source image, and f) merging the corresponding sub-regions of the source images independently of any of the filtered images to obtain the extended depth of field image.

18. The method of claim 17 wherein the merging step includes forming a sub-region for the extended depth of field image from one of the corresponding sub-regions of one of the source, the corresponding sub region having sample values greater in magnitude than corresponding sample values of another one of the corresponding sub-regions of another one of the source images.

* * * * *